United States Patent [19]
Cirino

[11] 3,798,696
[45] Mar. 26, 1974

[54] ROLLOVER CAR WASHER

[76] Inventor: John F. Cirino, Box 191, Churchville, Pa. 18966

[22] Filed: Aug. 23, 1972

[21] Appl. No.: 283,064

[52] U.S. Cl. .............................. 15/21 E, 15/DIG. 2
[51] Int. Cl. ................................................ B60s 3/06
[58] Field of Search ............ 15/21 D, 21 E, DIG. 2, 15/53, 97

[56] References Cited
UNITED STATES PATENTS

| 2,830,311 | 4/1958 | Vizdos | 15/21 D |
| 3,706,109 | 12/1972 | Bevier | 15/21 E |

FOREIGN PATENTS OR APPLICATIONS

| 1,528,264 | 4/1968 | France | 15/DIG. 2 |
| 1,233,741 | 2/1967 | Germany | 15/DIG. 2 |
| 1,081,366 | 8/1967 | Great Britain | 15/DIG. 2 |
| 1,185,331 | 3/1970 | Great Britain | 15/DIG. 2 |

Primary Examiner—Edward L. Roberts
Attorney, Agent, or Firm—Synnestvedt & Lechner

[57] ABSTRACT

A rollover car washer is disclosed incorporating a top brush, side brushes and preferably also window brushes. The top brush is provided with pivoted arms for upward and downward swinging motion of the top brush and the arms are pivotally mounted upon the frame of the washer about a horizontal axis located at an elevation below the top of the highest vehicles to be accommodated in the washing station. The range of swinging motion of the top brush is extended throughout a vertical distance providing not only for scrubbing of the highest surfaces of the car being washed, but also for scrubbing of the lowest end surfaces thereof. The side brushes are mounted upon the washer frame and rotate upon generally upright substantially fixed axes.

11 Claims, 16 Drawing Figures

PATENTED MAR 26 1974

ROLLOVER CAR WASHER

BACKGROUND AND STATEMENT OF OBJECTS AND ADVANTAGES

This invention relates to car washers. A number of features of the invention are individually applicable to car washers of any type including those in which the car washing equipment is for the most part stationary and in which the cars being washed are drawn through the washing and scrubbing equipment. The features of the invention, however, are especially adapted for use in car washers of the rollover type, i.e., the type in which the washing and scrubbing equipment is mounted upon a frame, usually an inverted U-shaped frame, arranged to travel lengthwise through a bay over or with respect to a car washing station in which the cars being washed remain stationary during the washing operation. In the present application therefore the invention is illustrated and described as incorporated in car washers of the rollover type.

One of the major objectives of the invention is to provide a car washer of exceptional simplicity while at the same time providing highly effective washing and scrubbing action with respect to all surfaces of the cars being washed.

Although some of the individual features and devices employed have been used heretofore, per se, the invention also includes certain completely new and distinctive features and has integrated both the new features and those heretofore known per se in new inter-relationships providing not only for the overall simplification of the equipment but also for the highly efficient washing and scrubbing action desired.

As a preliminary to considering an example of such new inter-relationships, it is first noted that in car washer terminology, the brush which scrubs the top surfaces of the car is ordinarily mounted upon a horizontal axis extended transversely of the car washing station and is referred to as the "top brush". Brushes mounted upon generally upright axes at opposite sides of the washing station and positioned to scrub side surfaces of the cars in the washing station, especially the lower side surfaces, are commonly referred to as "side brushes". Brushes which are mounted upon generally horizontal axes extended lengthwise of the car washing station at opposite sides thereof in position to scrub the car windows are commonly referred to as "window brushes".

As illustrative of one of the new inter-relationships of features involved in the arrangement of the invention, reference is made to the contemplated use, in combination, of side brushes mounted to rotate about substantially fixed axes positioned so that the side brushes will effect scrubbing of the side surfaces of the cars being washed, together with a top brush which is pivotally mounted for upward and downward swinging movement throughout a range provided not only for scrubbing of the upwardly presented surfaces of the cars, but also of the forwardly and rearwardly presented surfaces of the front and rear ends of the cars.

Although some car washing brushes having substantially fixed axes are known, nevertheless the combination just referred to provides for highly effective scrubbing action of all surfaces of the cars, and at the same time for exceptional simplification of the equipment. This new combination disclosed herein is in striking contrast to many prior art car washers in which it is very common to employ side brushes which are mounted upon pivoted arms or levers, frequently of double jointed configuration, the side brushes being relied upon not only to scrub the side surfaces of the cars, but also to scrub at least the lower front and rear end surfaces of the cars. In this common prior washer configuration the top brush though pivotally mounted for upward and downward swinging motion is not relied upon for the scrubbing of the lowest front and rear end surfaces of the cars.

By employment of the combination of the present invention, i.e., side brushes on substantially fixed axes and a pivotally mounted top brush, and by extending the range of pivotal motion of the top brush so that it may be relied upon not only for scrubbing of the upwardly presented surfaces of the cars, but also for scrubbing of all of the forwardly and rearwardly presented surfaces, applicant utilizes the basic pivotal mounting structure of the top brush (which mechanism is required in any event) to perform some of the function heretofore assigned to separate and additional pivot mounting structures utilized in certain prior art arrangements in order to cause the side brushes to take care of the scrubbing required on the forewardly and rearwardly presented surfaces of the ends of the cars. In this way applicant has achieved a very substantial overall simplification of the equipment without any appreciable sacrifice of scrubbing effectiveness on any of the surfaces of the cars. This simplification is achieved even if the side brushes have a somewhat yielding mounting, and whether or not window brushes are also included in the system.

When separate window brushes are not included, the side brushes are desirably of greater vertical dimension in order to scrub the window areas. The invention also contemplates a novel arrangement of the pivotal mounting mechanism for the top brush. According to this feature, the arms or levers for mounting the top brush are of simple rather than compound or double jointed construction, and at the same time provision is made for pivotal mounting of the arms about an axis which is lower than the roof level of the highest cars intended to be accommodated in the washing station. For this purpose, instead of employing a transverse mounting shaft extended from side to side of the car washing station, as in various prior art arrangements, a "split" mounting shaft arrangement is used, i.e., an arrangement employing a pair of stub shafts positioned at opposite sides of the car washing station on a common axis, each stub shaft serving to mount one of the brush mounting arms. In this way, clearance is provided between the arms and between the inner ends of the stub shafts, accommodating the cars being washed, notwithstanding the fact that the axis of pivotal motion of the brush mounting arms is located at an elevation lower than the top of the highest cars intended to be accommodated.

The use of the "split" mounting shaft for the top brush is advantageous for a number of reasons in any type of car wash, but it is of special advantage in a rollover type car wash of the kind herein disclosed in which the top brush is relied upon to scrub not only the top surfaces of the cars, but also the lowest end surfaces thereof. One reason why the split mounting shaft for the top brush is of special advantage in the general configuration of brushes contemplated for use according to the present invention is that, with the split mounting shaft, the axis for pivotal or swinging motion of the top brush may be lowered (because it is not required to be above the top of the highest vehicles to be accommodated), and with the pivotal axis lowered, the pivotal arms for carrying the top brush may be shortened and still providing for downward swinging of the top brush to a position low enough to effect scrubbing of the lowest end surfaces of the ends of the cars.

According to the present invention a novel counterweight or counterbalancing means is provided for the top brush. Since the pivotal mounting shaft for the top brush is of split construction, the invention preferably employs two separate counterweights respectively associated with the two arms positioned at opposite sides of the washing station. By dividing the total counterweight in this manner, instead of placing the entire counterweight at one side, forces tending to unsymmetrically twist the mounting structure for the top brush are avoided. Moreover by dividing the total counterweight and applying a portion at each side in association with each of the brush mounting arms, offsetting of the center of gravity of the counterweight from the pivotal axis may be reduced. The use of the split mounting shaft, with the consequent shortening of the pivotal arms for mounting the top brush also provides for minimization of the offset of the center of gravity of the counterweighting from the pivotal axis. All of these factors are of advantage in minimizing the overall dimensions and clearances required, which is of importance in providing for installation of the car washer in a bay of minimum dimensions, especially minimum length.

Other features of the arrangement of the invention are also of significance in reducing the overall length of the bay required for mounting and operation of the car washer of the invention, as will further appear.

As above indicated various of the features and arrangements of the invention are of a special advantage in a car washer of the rollover type. It is contemplated that these features may be employed either in an automatic cycling type of rollover car wash or in a rollover car washer in which most of the functions are manually controlled. Indeed various of the features of the invention facilitate reliance upon manual control, especially manual control of the motions of the top brush, with consequent extensive further simplification of the equipment.

Still another objective of the invention is the provision of equipment which, regardless of whether automatically cycled or manually controlled, is stable or safe in its operation, even in the event of malfunction in the cycling control system, or in the event of erroneous manual handling of the equipment. According to this feature, provision is made for travel of the frame of the equipment upon power driven wheels, and the frame is provided with abutment or stop means adapted to engage the supporting surface, such as the tracks in the event the frame tends to tilt, these stop means being so positioned that any appreciable tilting of the frame will result in lifting of the driving wheels from the tracks or other supporting surfaces, thereby automatically terminating the drive and preventing the equipment from tilting over.

BRIEF DESCRIPTION OF FIGURES

How the foregoing objects and advantages are attained together with others which will occure to those skilled in the art will be clear from the following description referring to the accompanying drawings illustrating preferred embodiments of equipment according to the invention, and in which.

DESCRIPTION OF EMBODIMENTS OF THE EQUIPMENT AS SHOWN IN DRAWINGS

In this specification and in the claims, reference is made to equipment for use in washing "cars", but it is to be understood that the equipment is useable not only with respect to passenger cars, but also with respect to various forms of trucks, such as panel trucks.

Figure 1:
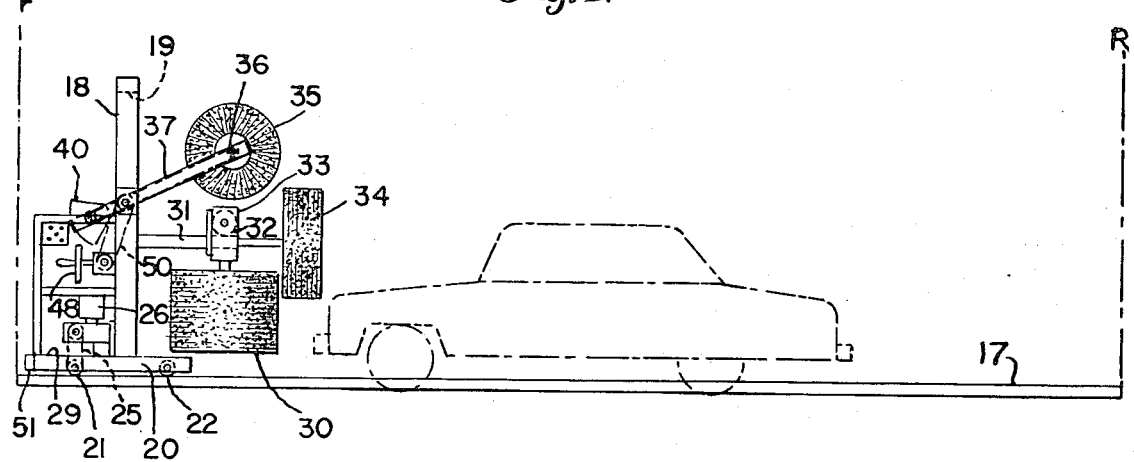
FIG. 1 is a side elevational view of one form of rollover car washer according to the invention, a car being indicated in the washing station.

In a typical installation, for instance as shown in FIGS. 1 to 12 inclusive, a rollover car washer incorporating features of the present invention is adapted to be mounted in and to operate in a bay, for instance the bay lying between the vertical dash lines F and R shown in FIG. 1 and also in various other figures, the line F representing the front end of the bay and the line R representing the rear end. Although the washer of the invention may, if desired, be mounted in the open, ordinarily the washer is mounted in a bay provided within a building having an entrance for the cars at the rear end R of the bay and an exit for the cars at the front end F of the bay. It is contemplated according to the invention that the equipment be so arranged as to be capable of mounting and operation in a bay of relatively short length, for instance of about 28 feet in length, which is typical of available bay space in the buildings of service stations. In this way, and by simplifying the equipment in order to reduce the overall cost, it becomes practicable to install the car washer in service stations, so that car washing in addition to lubrication and other customary activities may be carried on at the typical local service station.

In the embodiment of the equipment shown in FIGS. 1 to 12 the equipment is arranged to provide maximum simplicity and to provide for manual operation or control of most of the functions to be performed.

Tracks, such as indicated at 17 are laid lengthwise through the bay, one track being located toward each side of the car washing station in the bay. The car washing station lies, in general, mid-way between the front and rear limits F and R of the bay.

Much of the equipment incorporated in the washer is mounted upon an inverted U-shaped frame which comprises upright members 18 and a transverse member 19, the upright members being mounted upon base members 20. Pairs of grooved wheels 21, 22 and 23, 24 co-operate with and ride upon the tracks 17. The washer is adapted to be driven along the tracks by drive wheel 21, a suitable drive mechanism being indicated in FIGS. 2 and 3, including chain 25 with co-operating sprockets, one of which is connected with the motor 26. The motor is preferably of reversible type, being under the control of switch buttons shown in FIG. 2 at 27 and 28, one of these buttons providing for drive of the motor and thus of the washer in one direction and the other providing for travel of the motor and thus of the washer in the other direction. The frame of the machine is also provided with a platform 29 on which an operator may stand in a position providing convenient access to various of the controls.

Side brushes 30, 30 are mounted on generally upright axes by means of brackets 31, 31 connected with the frame. Motors 32 are provided for driving the side brushes, the motors being connected with the brushes through appropriate reduction gearing as at 33.

Preferably, the brackets 31 provide also for the support of window brushes such as indicated at 34, and these window brushes are also driven from the reduction gearing 33 so that the motor 32 and the gearing 33 serve to drive not only the side brush, but also the window brush, at that side.

Figure 2:
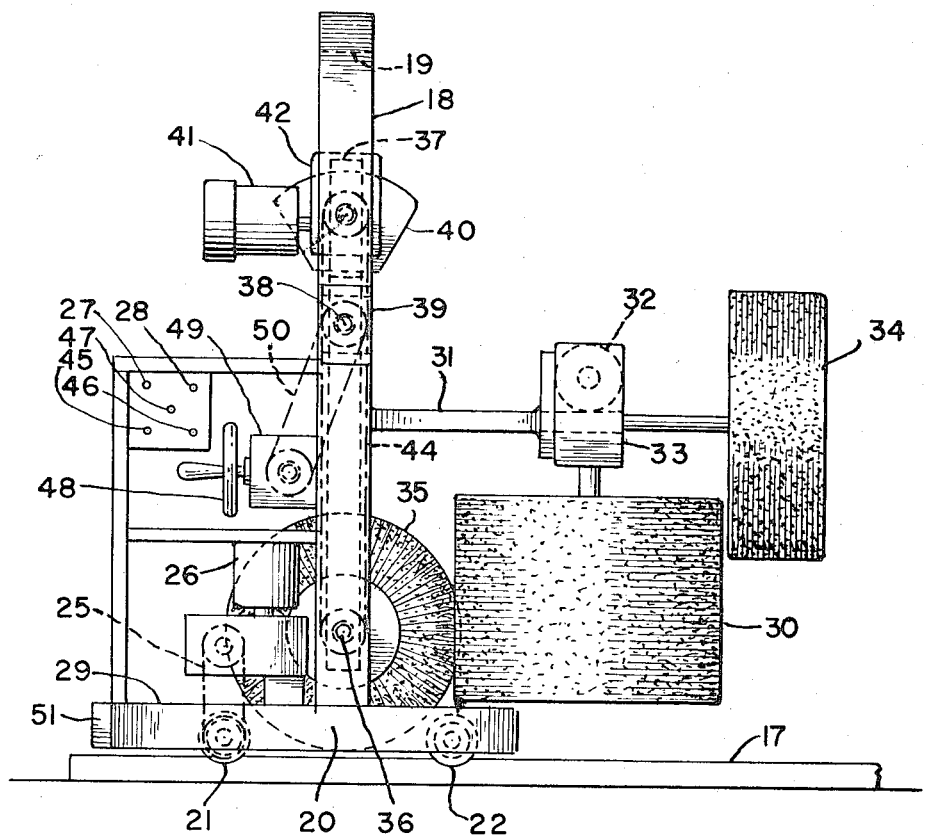
FIG. 2 is an enlarged view of the equipment shown in FIG. 1, but with the top brush in a different position.
Figure 3:
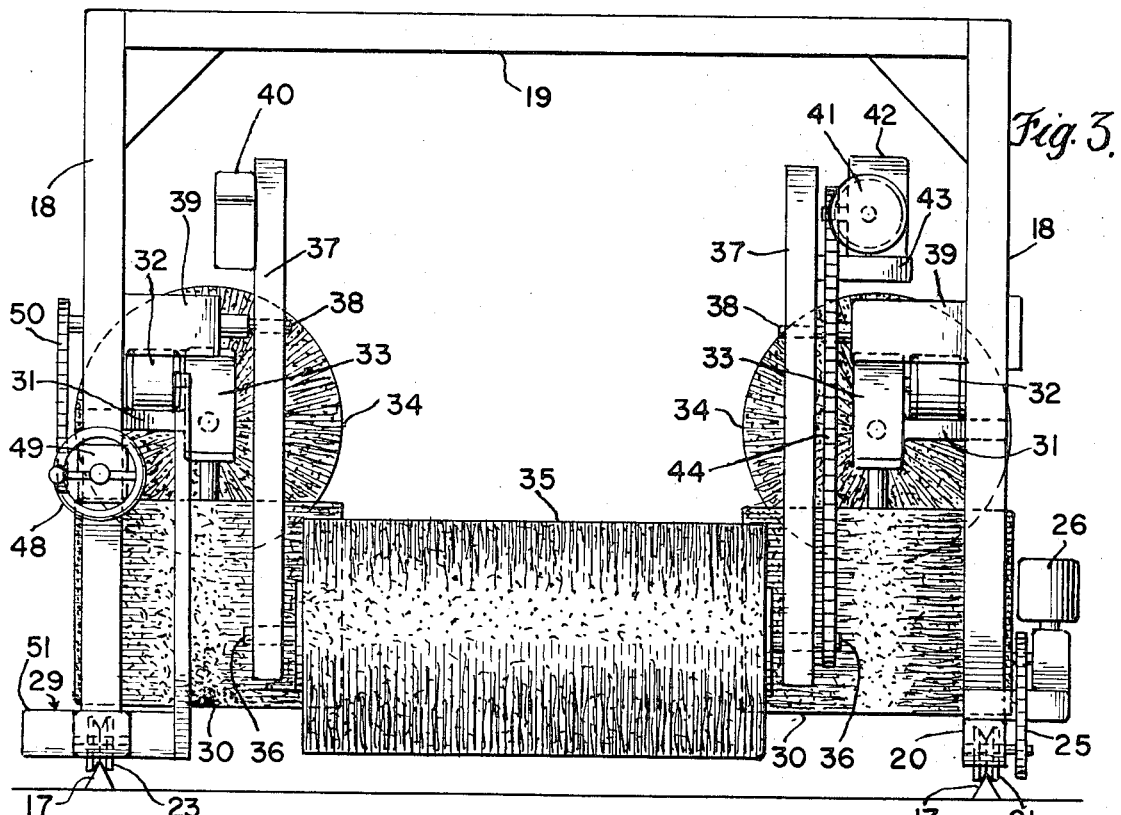
FIG. 3 is an end view taken from the left of FIG. 2.
Figure 4:
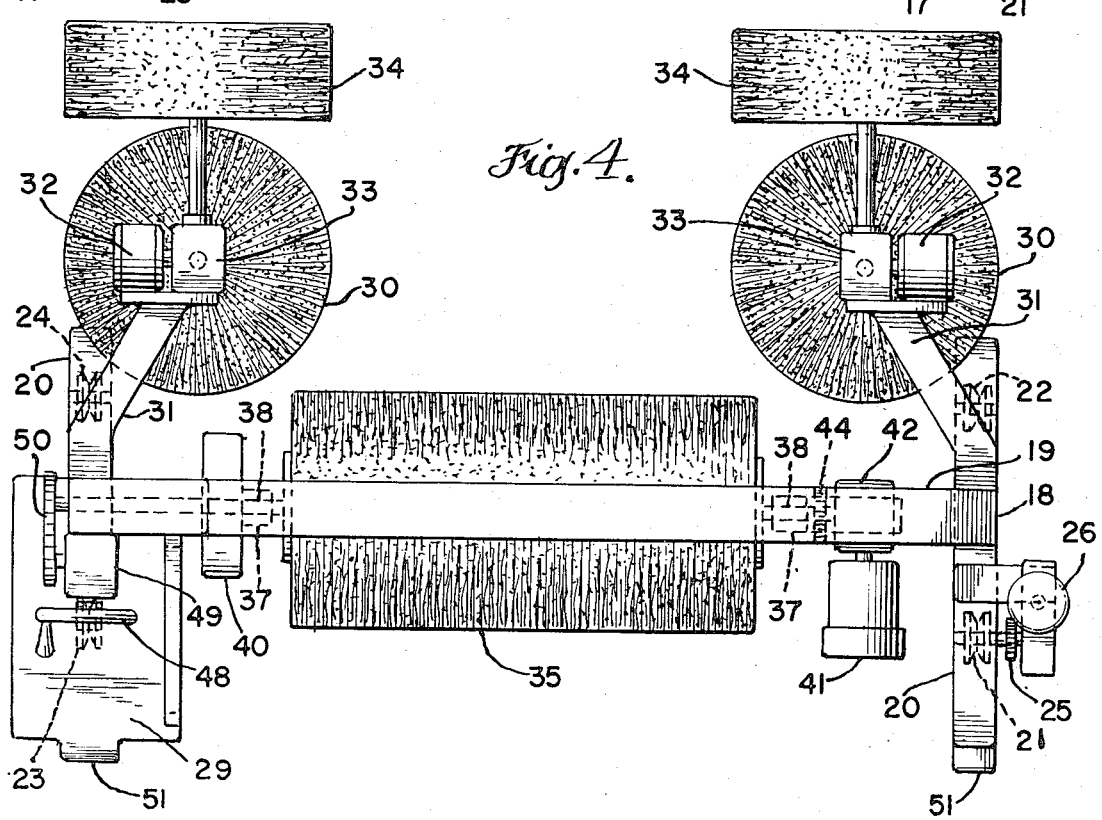
FIG. 4 is a top plan view of the equipment shown in FIGS. 1, 2 and 3.

The top brush 35 has its shaft or axis 36 positioned horizontally and rotatively mounted at the free ends of a pair of pivotal or swinging arms 37,37 Each of these arms is fixed to a stub shaft or pivot 38 which is journaled in bearings within the housing 39 carried by the upright frame element 18 at that side of the machine. The two pivots 38 are arranged to have a common axis, so that the two arms 37 and thus the top brush may swing or pivot about a common axis extended transversely of the washing station provided in the bay in which the equipment is installed. Each arm 37 desirably also carries counterweight means at the side of the pivot 38 opposite to the brush 35. As viewed in FIG. 3, the counterweight is shown at 40 for the left hand arm 37. The counterweighting of the other arm is advantageously effected by utilizing the weight of the motor 41 and the reduction gearing unit 42 which are provided for rotating the top brush. As seen in FIGS. 2, 3, and 4 the motor and reduction unit are mounted upon a bracket 43 carried by the arm 37 at a point offset from the pivot 38 in a direction opposite to the mounting of the brush on the arm. The top brush 35 is adapted to be driven from the motor and gearing unit 41,42 by means of the drive chain 44 co-operating with sprockets respectively associated with the brush shaft 36 and with a power shaft projecting from the reduction unit 42.

Flexible power connection (not shown) with the motor 41 provides for control and reversal of direction of drive of the brush 35, for instance by switch control buttons 45 and 46 positioned for access from the operator's station or platform 29. Control means for the motors 32 for the side and window brushes may also be provided, for instance in the form of another switch button 47.

Attention is now directed to the fact that the mounting arrangements and positioning of the various brushes provides for a wide range of angular motion or swinging of the arms 37 for the brush 35. Indeed, as will be more fully brought out herebelow, the brush 35 may swing all the way from a position such as shown in FIG. 1 where the brush is lifted even above the top level of the cars in the washing station, downwardly to a position vertically below the swinging pivot axis 38 (see FIG. 2), and to a position upwardly inclined at the side of the frame opposite to the position illustrated in FIG. 1.

Although power means may be provided for swinging the top brush, including an automatically cycling control system, as will be described more fully hereinafter with reference to the embodiment shown in FIGS. 13 to 16, one specially advantageous and preferred form of equipment according to the invention employs no power means for moving the top brush. This is the arrangement illustrated in FIGS. 1 to 12 and, in this embodiment, various motions of the top brush may be provided for in part by automatic operation under the influence of gravity, for which purpose the counterweighting of the top brush is selected or adjusted so that the brush itself will always swing downwardly by gravity, unless the swinging motion is interrupted or restricted by virtue of contact of the brush bristles with surfaces of the cars being washed. With the free swinging motion provided for in the arrangement of FIGS. 1 to 12, the entire washer may merely be driven in one direction and then in the opposite direction with respect to the washing station, as by the power driven wheel or wheels 21, and as the top brush approaches either the front and/or the rear end of a car being washed, the bristles will first scrub the lowest end surfaces, and the brush will then ride up upon the hood or trunk or other surface of the vehicle and ultimately up over the roof, to descend again under the action of gravity at the opposite end of the car being washed. For most effective washing action, it is preferred that when the top brush is brought into either end of a car by the motion of the washer, the direction of rotation of the top brush be such that the bristles move upwardly into the end surfaces of the car. This requires that the top brush be capable of being driven in either direction, since it is contemplated that the brush be brought into engagement with both ends of the car being washed. The controls for changing direction of rotation of the brush is of course accessible to the operator in the manner already described.

As indicated, the embodiment of FIGS. 1 to 12 may be employed without power means and without special control of the swinging motion of the top brush. However it is advantageous also to provide for at least some manual control of the motions of the top brush. For this purpose the embodiment of FIGS. 1 to 12 is provided with a control wheel 48 connected through gearing unit 49 (see FIGS. 2 and 4) with a chain 50 having a sprocket connection with the pivot shaft 38 at one side of the equipment. It will be understood that manual rotation of the wheel 48 will cause the arms 37 to swing, thereby swinging the brush 35. Preferably the transmission from the wheel to the pivot shaft 38, for instance the gearing unit 49, is arranged to provide a gear ratio such that a number of turns of the hand wheel are required to move the brush carrying arms through any appreciable angular range. A ratio up to about 20 to 1 is effective for the purposes here contemplated, and this will give the operator sufficient advantage so that he may hold the brush in scrubbing engagement with various surfaces of the car even by application of relatively light manual force upon the hand wheel. At the same time, by employment of appropriate transmission elements, such as bevel gearing the transmission between the hand wheel and the brush mounting pivot 38 will be "reversible" i.e., the action of gravity acting upon the brush will swing the brush downwardly, provided the operator releases the hand wheel. In this way, for some or all of the motions of the top brush, the operator may exercise control.

Though not herein illustrated, it will be understood that water sprays, detergent supply and drying air conduits will be employed and these may be provided in any known or desired manner.

Figure 5:
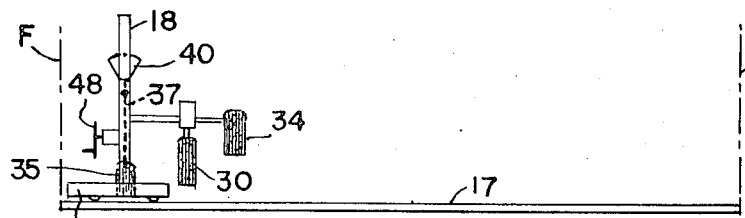
FIGS. 5 to 12 are somewhat diagrammatic views illustrating various events occurring sequentially in a typical use in the equipment shown in FIGS. 1 to 4.
Figure 6:
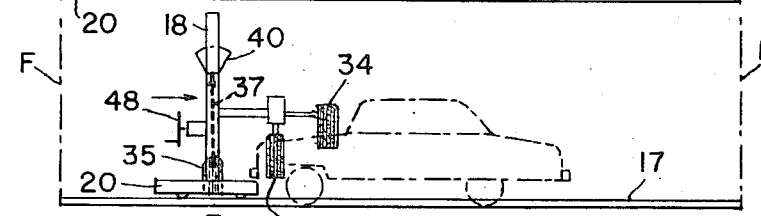

A typical mode of operation of the equipment of figures 1 to 12 is illustrated somewhat diagrammatically in the sequence of the FIGS. 5 to 12 inclusive which may briefly be described as follows:

FIG. 5 illustrates the equipment in the position also illustrated in FIG. 1 but in FIG. 5 the brushes are shown as non-rotating, the equipment being positioned toward the front end of the bay as is contemplated when the equipment is parked or not in use. FIG. 6 is a view similar to FIG. 5 but illustrating a car which has been brought into the washing station by being driven into the bay from the rear end thereof. FIG. 6 also indicates the washer moved somewhat toward the right as compared with FIG. 5.

Figure 7:
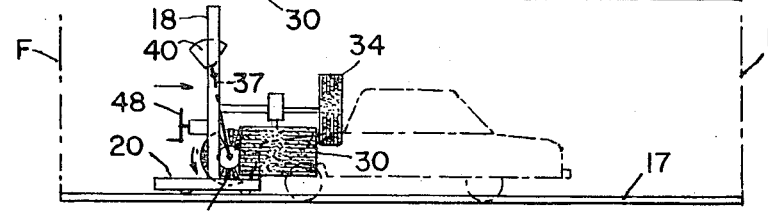

FIG. 7 shows a position of the washer as in FIG. 6 but with the brushes rotating, the top brush being driven in counter clockwise direction and being swung into the front end of the car as by operation of the hand wheel 48. From this position the top brush may be further raised and if desired the washer may be momentarily held in a given position or may be further advanced or may even be moved back toward the left, according to the washing action desired.

Figure 8:
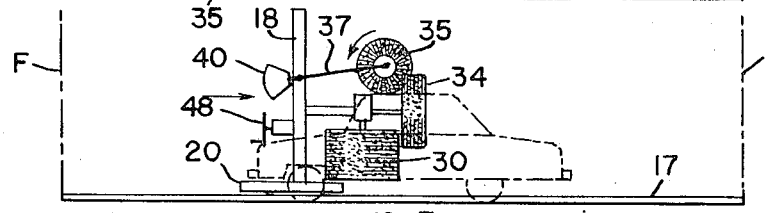

In FIG. 8 the top brush has been raised sufficiently high to pass over the top of the car. If desired the brush may be swung to the opposite side of the frame of the washer in progressing from the condition of FIG. 7 to the condition of FIG. 8, but in either event the hand wheel may be used to insure adequate scrubbing force.

Figure 9:
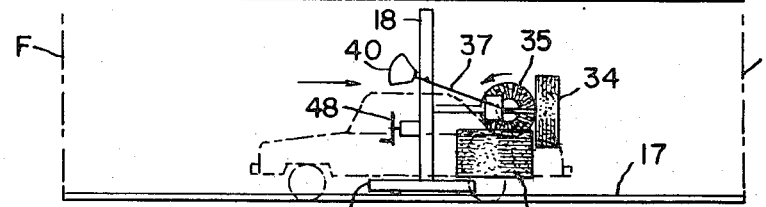

FIG. 9 illustrates a further advanced position of the washer in which the top brush has now reached the trunk of the car.

Figure 10:
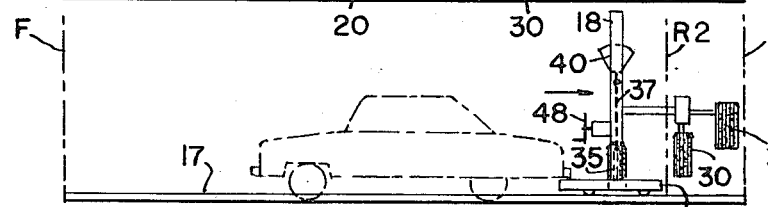
Figure 11:
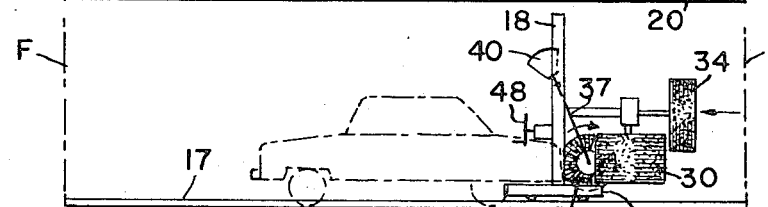

In FIG. 10 the washer has traveled toward the rear of the bay to a point where the top brush is out of contact with the rear end of the car. At this point it is appropriate for the direction of rotation of the top brush to be reversed and for the motion of the washer to be started in the opposite direction, toward the front of the bay, in order to bring the top brush into engagement with the rear end surfaces of the car, it being understood that some scrubbing pressure may again be applied by appropriate action on the hand wheel 48.

Figure 12:
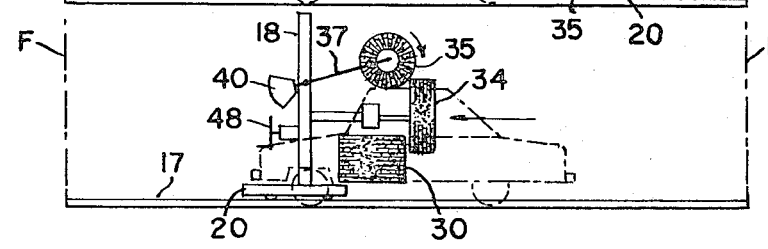

As the travel of the washer toward the left continues as shown in FIG. 12, the top brush will again ride up over the top of the car and may be used to effect a second scrubbing of the top, the motion of the washer to the left being continued until the equipment returns to the parking position indicated in FIGS. 1 and 5. If it is desired to have scrubbing action upon the top surfaces of the car during only one direction of travel of the washer, the manual control may be used to raise the top portion to a position out of contact with the top surfaces of the car during the reverse travel of the washer from the rear end of the bay back to the front end.

With regard to the general arrangement of the washer including the mounting of the brushes thereon, it will be noted that both the side brushes 30 and the window brushes 34 are positioned at the same side of the frame and further that the top brush may be swung to a position at the same side of the frame as the other positions. In view of this, the frame may readily be parked in a position very close to the front end or limit F of the bay in which the equipment is installed. At the rear end of the bay, if desired, the range of travel or motion of the washer may be such that the various brushes will project beyond the rear limit of the bay, and to illustrate this point, a second limit line R2 has been applied to FIG. 10. It will be understood that this configuration of brushes thus permits installation and operation of the equipment in a bay of minimum axial length, even down to about 26 feet, thereby enabling installation of this form of washer in typical service stations, without the necessity for any special building construction. An even shorter bay will suffice where only very short cars are to be accommodated.

Attention is now called to the fact that the axis of the arm pivots 38 is positioned at an elevation lower than the elevation of the highest cars to be accommodated in the washing station of the washer. For various reasons hereinabove set forth, the lower positioning of the pivotal axis for the top brush is of advantage as it permits a shorter pivotal arm, notwithstanding the fact that the top brush is relied upon to scrub not only the top surfaces of the car, but also the end surfaces including even the lower most end surfaces. Various other advantages of the split mounting shaft comprising the pivot or stub shafts 38 have also been explained hereinabove.

Still another feature of importance in the embodiment shown in FIGS. 1 to 12 is the provision of the abutment or stop 51 projecting from the platform 29 in a position which will limit or restrict tilting motion of the frame in a direction toward the abutment 51. If the equipment is mishandled so that the top brush is urged against the end of a car in the washing station with excessive force or if the free swinging motion of the brush is impaired in some manner, the initial tilting motion of the washer frame will bring the abutment 51 into contact with the track. Any further tilting motion will then result in lifting of the driving wheel 21 from the track and thus terminate the driving force tending to push the brush against the end of the car. This is a safety feature which automatically prevents upsetting of the equipment, even under conditions where for some abnormal reason the swinging motion of the top brush is impaired or locked out.

In the embodiment of the equipment illustrated in FIGS. 13 to 16, certain features already described with reference to FIGS. 1 to 12 are also utilized including for example, the split mounting shaft for the top brush and including also the combination of side brushes mounted upon substantially fixed axes, together with a top brush arranged to have freedom of motion through a range providing not only for scrubbing of the top surfaces of the cars, but also for scrubbing of even the lowest end surfaces of the cars. In the embodiment of FIGS. 13 to 16, however, the equipment is arranged somewhat differently and is provided with power means for moving the top brush, and also with an automatic cycling system for effecting the desired motions of the washer as a whole as well as of the top brush with respect to the frame.

As in the first embodiment the washer comprises an inverted U-shaped frame structure here indicated at 52, being mounted upon wheels 53 adapted to travel upon the tracks 54.

The top brush 35a is mounted in a manner generally similar to that described above, i.e., by means of pivot arms 37a and stub shafts 38a. In the embodiment of FIGS. 13 to 16 counter-weighting is provided by a counter weight 40a at one side and by the motor and gear reduction unit 41a, 42a mounted on the bracket 43a at the other side, which later, in this instance is enclosed within the hollow, upright structure forming one of the legs of the U-shaped frame. The top brush is driven by means of a chain 44a co-operating with sprockets on the brush shaft and on a shaft extended from the gearing unit 42a through an arcuate slot in the frame leg.

The side brushes 30a are mounted on substantially fixed axes by means of brackets 31a, at one side of the U frame, and the window brushes 34a are mounted on generally fore and aft axes at the opposite side of the U frame.

Figure 14:
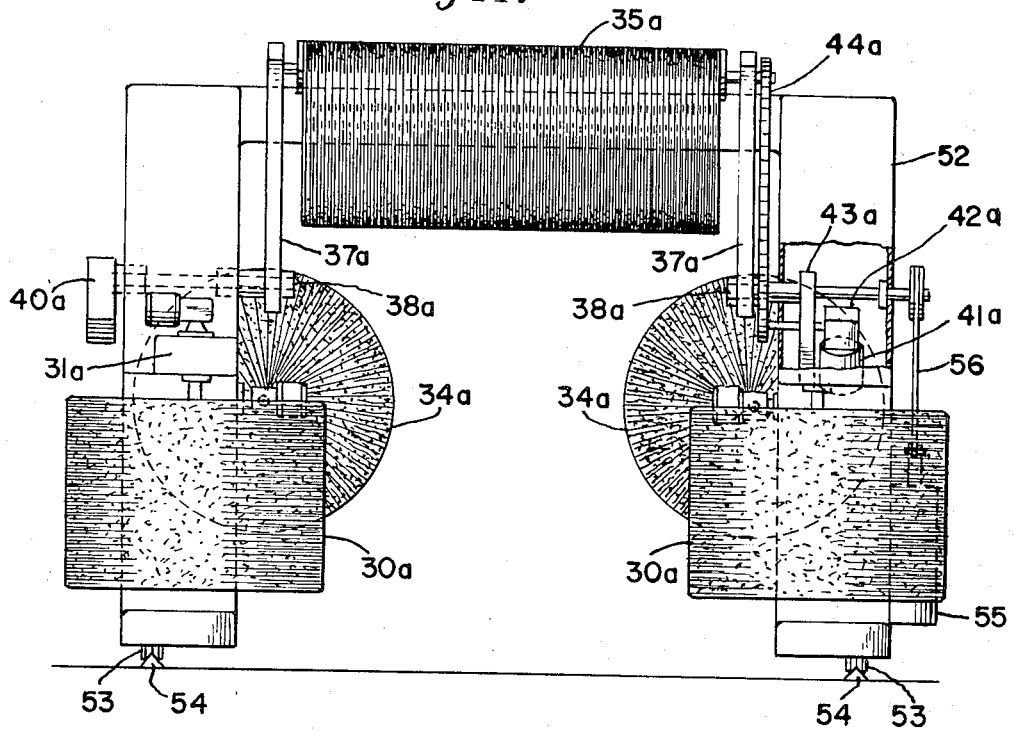
FIG. 14 is a view taken from the left of FIG. 13.
Figure 13:
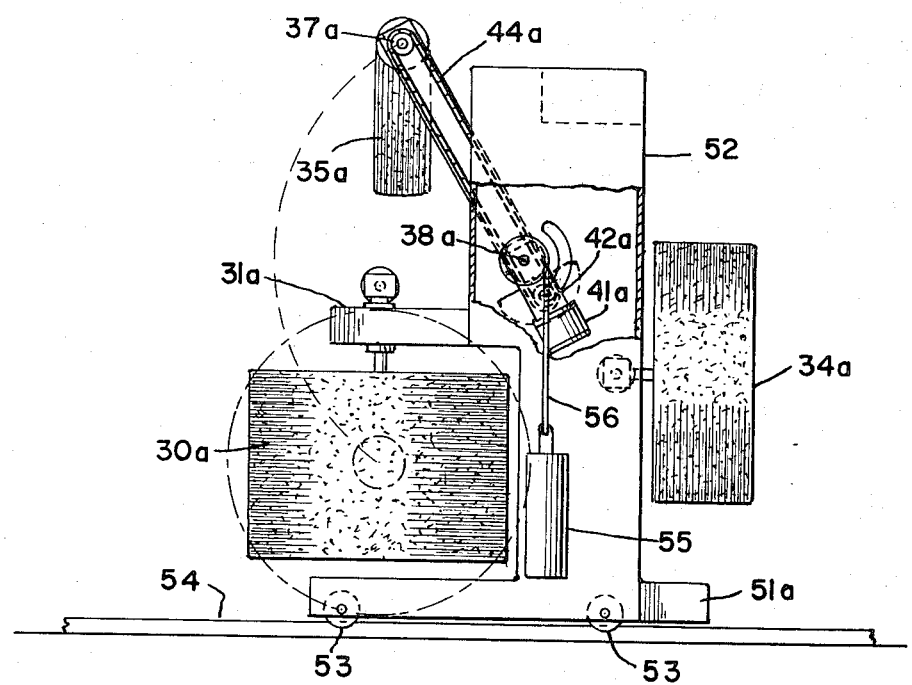
FIG. 13 is a side elevational view with portions broken out, illustrating a modified form of the equipment according to the invention.
Figure 15:
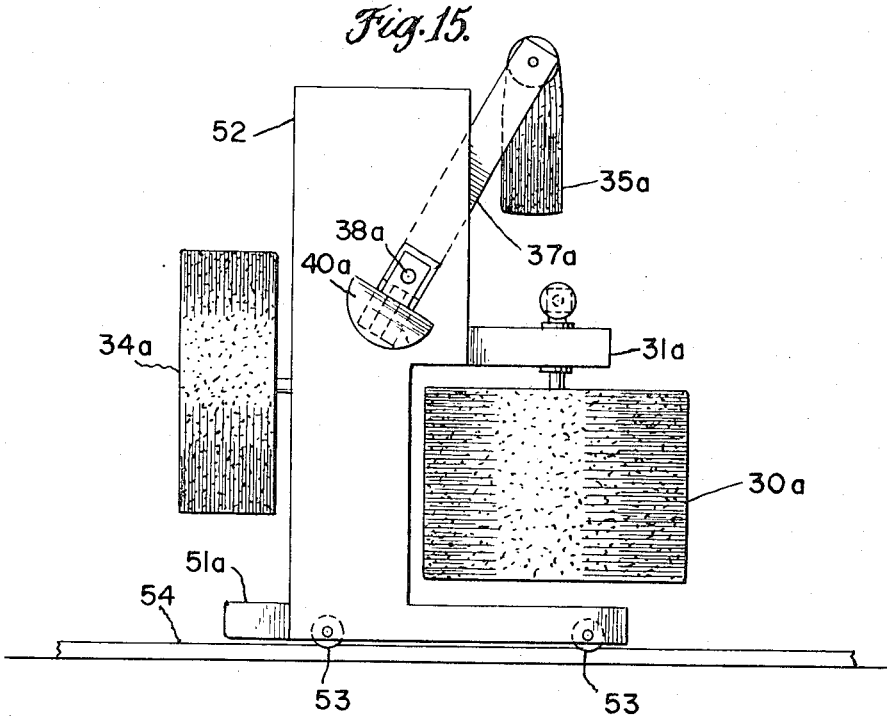
FIG. 15 is a view of the equipment shown in FIGS. 13 and 14 but taken looking in a direction opposite to FIG. 13.

In the embodiment of FIGS. 13 to 16 provision is made for powered operation of the swinging motion of the top brush and for this purpose a piston and cylinder device indicated in FIGS. 13 and 14 at 55 is provided, the piston of this device being connected by the cable 56 having its upper end wrapped around a pulley on one of the stub shafts for mounting the brush supporting arms. By downward motion of the cable 56 under the influence of fluid pressure control in the piston 55, the counterweighted top brush 35a may be raised, for instance, through the range indicated in FIG. 13.

A stop or abutment 51a is also advantageously provided on the frame so that upon excessive or abnormal tilting of the frame under the influence of malfunctioning of the equipment, the driving wheel will be raised from the supporting surface or track, thereby automatically avoiding upsetting of the equipment.

Figure 16:
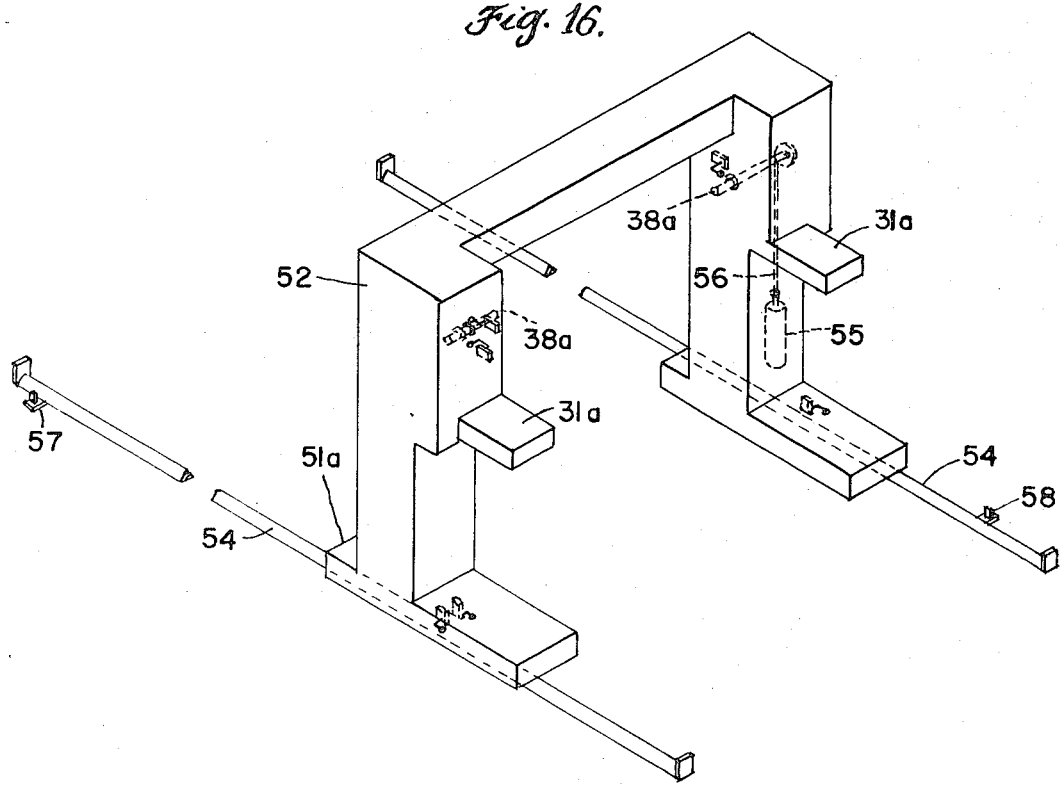
FIG. 16 is an isometric view of portions of the equipment of FIGS. 13, 14 and 15, illustrating the position of the equipment with respect to the mounting tracks.

With the equipment of FIGS. 13 to 16, it is contemplated that an automatically cycling system be utilized which would be capable of following through a sequence of operations of the general kind described above with particular reference of FIGS. 5 to 12, and for this purpose switch operating pegs such as indicated in FIG. 16 at 57 and 58 may be employed cooperating with control switches mounted in the base of the frame. Other switches and controls may be associated with the stub shafts 38a, and these and other control elements of known type may be used to provide for cycling of the frame drive mechanism as well as of the swinging motion of the top brush and various other functions including reversal in direction of rotation of the top brush and also lifting of the top brush to an upper or "parking" position.

Specifically, the control system may be programmed or arranged to follow a sequence of operations, for example as described just below:

With the washer in the "parking" position, for instance at the front end of a bay such as shown in FIGS. 5 to 12, and with the equipment turned off, the brushes will be stationary and the top brush 35a will be in its upward position.

When a car is brought into the washing station, the operator may actuate a "start" button, thereby initiating rotation of the brushes and initiating travel of the washer toward the front end of the car to be washed.

This action will start the washing operation, the top brush being in the lowermost position so as to scrub the front surfaces of the car.

When a switch actuator peg such as shown in FIG. 58 is encountered this may be utilized to initiate upward swinging motion of the top brush, and the washing will then proceed over the hood of the car and over the top of the car, the brush again descending onto the trunk and then off the rear end of the car.

The washer may then proceed all the way to the rear limit of the tracks or bay, for instance to a switch operating peg such as shown in 57 which may be utilized to reverse the rotation of the top brush and to initiate return travel of the washer. This will bring the top brush into engagement with the rear surfaces of the car, and the top brush may thereafter be raised for instance to an inactive position above the top of the car. At this time the rotation of the top brush may be terminated and the washer may proceed in its travel to the front end of the bay and assume the "parking" position.

In order to avoid upsetting of the washing because of malfunctioning, the embodiment of FIGS. 13–16 also includes abutment or stop means 51a positioned and functioning in the manner already described.

Various features of the present invention will thus be seen to be applicable not only to a system in which the equipment is adapted for manual operation but also in which the equipment is completely automatically cycled.

Some of the automatic features of the embodiment of FIGS. 13 to 14 may also be included in an arrangement of the kind shown in FIGS. 1 to 12. For instance, if desired, a brush lifting cylinder of the type indicated at 55 may be applied to the arrangement of FIGS. 1 to 12, and used for the purpose of lifting the brush and retaining it in top position for parking. This feature may even be applied to FIGS. 1 to 12 without impairing freedom for manual operation when it is desired to have such manual operation.

I claim:

1. A rollover car washer comprising an inverted U-shaped frame arranged to travel over a car washing station, a rotative brush for scrubbing top surfaces of cars positioned in the work station, the brush having a horizontal mounting shaft, and mounting mechanism for the brush including a pair of arms spaced from each other at opposite sides of the washing station, the brush mounting shaft being journalled in one end of each arm, and axially aligned stub shafts for pivotally mounting said arms, said stub shafts being mounted on the frame in positions offset from each other at opposite sides of the washing station and being connected with the other ends of the arms with their axes aligned and passing through said other ends of the arms, and further including driving means for the brush mounted in association with one of said arms in position to serve as a counterweight.

2. A rollover car washer comprising an inverted U-shaped frame arranged to travel over a car washing station, a rotative brush for scrubbing top and end surfaces of cars positioned in the washing station, the brush having a horizontal mounting shaft, and mounting mechanism for the brush including a pair of arms spaced from each other at opposite sides of the washing station, and axially aligned stub shafts for mounting said arms, the stub shafts being mounted inside of the frame at opposite sides of the washing station and providing an axis of swing motion at a predetermined elevation, the length of said arms being sufficient to provide freedom for swinging movement of the brush toward either side of a position vertically below the axis of swinging motion at said elevation through a range extended higher than the topmost surface of the car in the washing station.

3. A rollover car washer as defined in claim 2 in which the mounting mechanism provides for free swinging of the brush under the action of gravity, and controllable lifting means for upwardly swinging the brush.

4. A rollover car washer as defined in claim 3 and in which the lifting means comprises a manually operable control means.

5. A rollover car washer comprising an inverted U-shaped frame having wheels mounting the washer on a supporting surface and providing for travel of the washer over a car washing station adapted to accommodate cars to be washed, a rotative brush for scrubbing surfaces of cars positioned in the work station, the brush having a horizontal mounting shaft, mounting mechanism for the brush including a pair of arms pivotted to the frame and spaced from each other at opposite sides of the washing station and providing for pivotal movement of the brush to a position providing for scrubbing of end surfaces of a car in said station when the washer travels on said wheels, wheel drive means for effecting travel of the washer over the supporting surface, and means for restraining tilting of the frame when the brush engages end surfaces of a car under the influence of travel of the washer, the tilt restraining means comprising a stop device mounted on the frame and projecting horizontally beyond a driven wheel in a position adjacent to the supporting surface, the projection of the stop device and the proximity thereof to the supporting surface providing for lifting of said driven wheel from the supporting surface upon tilting of the frame and thereby effect termination of the drive effect of said wheel.

6. A rollover car washer comprising an inverted U-shaped frame arranged to travel over a car washing station adapted to accommodate cars to be washed, a rotative brush for scrubbing top and end surfaces of cars positioned in the work station, the brush having a horizontal mounting shaft, and mounting mechanism for the brush including a pair of arms providing for upward and downward swinging of the brush, an operators station on the frame, and means for manually swinging the brush on its mounting mechanism including a manually operable control organ connected with the mounting mechanism and positioned on the frame for convenient access by an operator in the operators station.

7. A rollover car washer as defined in claim 6 and further including drive means for effecting travel of the washer, and a drive control on the frame positioned for convenient access by an operator in the operators station.

8. A rollover car washer comprising an inverted U-shaped frame arranged to travel over a car washing station, a rotative brush for scrubbing top and end surfaces of cars positioned in the washing station, the brush having a horizontal shaft, and mounting mechanism for the brush including a pair of arms positioned inside of the frame and spaced from each other at opposite sides of the washing station, and pivot means for mounting said pair of arms on the frame and providing a pivotal axis at a predetermined elevation and for pivotal movement of the arms about said axis at said elevation through a range extending from a bottom pivotal position upwardly in either direction to a position higher than the topmost surface of the car in the washing station.

9. A car washer as defined in claim 8 and further including a hand control for pivotally moving the brush on the pivot means.

10. A car washer as defined in claim 9 in which the hand control includes reduction gearing facilitating manual operation of the hand control.

11. A car washer as defined in claim 10 in which said gearing is reversible to provide freedom for pivotal movement of the brush under the action of gravity when the hand control is released.

* * * * *